United States Patent
Ahluwalla et al.

(10) Patent No.: US 9,713,194 B2
(45) Date of Patent: Jul. 18, 2017

(54) SYSTEM AND METHOD FOR DATA NETWORK REASSIGNMENT

(75) Inventors: Mankesh Ahluwalla, Schaumburg, IL (US); Sumeet Singh Bhatia, Hoffman Estates, IL (US); Jaideep Abichandani, St. Charles, IL (US); Narothum Saxena, Hoffman Estates, IL (US); Michael Shannon Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 883 days.

(21) Appl. No.: 13/339,022

(22) Filed: Dec. 28, 2011

(65) Prior Publication Data

US 2013/0171959 A1   Jul. 4, 2013

(51) Int. Cl.
| | | |
|---|---|---|
| H04M 11/00 | (2006.01) | |
| H04W 76/06 | (2009.01) | |
| H04W 36/00 | (2009.01) | |
| H04W 76/02 | (2009.01) | |

(52) U.S. Cl.
CPC ....... *H04W 76/06* (2013.01); *H04W 36/0022* (2013.01); *H04W 76/028* (2013.01)

(58) Field of Classification Search
USPC .......... 455/405, 411, 436–444, 406; 709/226
See application file for complete search history.

(56) References Cited

U.S. PATENT DOCUMENTS

| | | | |
|---|---|---|---|
| 5,495,426 A * | 2/1996 | Waclawsky et al. | 709/226 |
| 7,885,636 B2 * | 2/2011 | Taglienti et al. | 455/406 |
| 8,200,188 B2 * | 6/2012 | Gans | 455/405 |
| 8,331,236 B2 * | 12/2012 | Cavalli et al. | 370/235 |
| 2004/0073640 A1 * | 4/2004 | Martin et al. | 709/223 |
| 2004/0177144 A1 * | 9/2004 | Yip | 709/225 |
| 2005/0037732 A1 * | 2/2005 | Kotzin | 455/411 |
| 2007/0064604 A1 * | 3/2007 | Chen et al. | 370/230 |
| 2007/0153695 A1 * | 7/2007 | Gholmieh et al. | 370/235 |
| 2007/0260732 A1 * | 11/2007 | Koretz | 709/226 |
| 2008/0254763 A1 * | 10/2008 | Brink et al. | 455/405 |
| 2008/0256238 A1 * | 10/2008 | Hu et al. | 709/226 |
| 2010/0100637 A1 * | 4/2010 | Bowra et al. | 709/231 |
| 2010/0159934 A1 * | 6/2010 | Forssell | 455/437 |
| 2011/0080839 A1 * | 4/2011 | Taglienti et al. | 370/252 |
| 2011/0086610 A1 * | 4/2011 | Baldwin et al. | 455/405 |
| 2011/0151831 A1 * | 6/2011 | Pattabiraman | 455/405 |
| 2011/0275344 A1 * | 11/2011 | Momtahan et al. | 455/405 |
| 2011/0294502 A1 * | 12/2011 | Oerton | 455/426.1 |
| 2012/0064893 A1 * | 3/2012 | Reagor | 455/436 |

(Continued)

*Primary Examiner* — Charles Shedrick
(74) *Attorney, Agent, or Firm* — Leydig, Voit & Mayer, Ltd.

(57) ABSTRACT

Managing data resource utilization in a wireless network environment comprising a first data network and a second data network is described herein. The described management infrastructure and method incorporates monitoring data usage of a wireless network subscriber over the first data network, determining that the data usage over the first data network meets a specified threshold, and, in response to the determination that usage has reached the specified threshold, administratively disconnecting the wireless network subscriber from the first data network so as to cause a data session of the wireless network subscriber to be reassigned to the second data network.

33 Claims, 2 Drawing Sheets

(56) References Cited

U.S. PATENT DOCUMENTS

| | | | |
|---|---|---|---|
| 2012/0094631 A1* | 4/2012 | Pattabiraman | 455/405 |
| 2012/0157038 A1* | 6/2012 | Menezes et al. | 455/405 |
| 2012/0198046 A1* | 8/2012 | Shah et al. | 709/224 |
| 2013/0012160 A1* | 1/2013 | Rubin et al. | 455/406 |
| 2013/0023230 A9* | 1/2013 | Momtahan et al. | 455/405 |
| 2013/0023232 A1* | 1/2013 | Mendiola | 455/406 |

* cited by examiner

SYSTEM AND METHOD FOR DATA NETWORK REASSIGNMENT

FIELD OF THE INVENTION

This invention relates generally to the field of wireless communications networks and associated services. More particularly, the invention is directed to wireless data communication services (such as those supporting data flows to/from smart phones) in such networks, and more specifically to managing wireless network data resource utilization on an individual user basis in accordance with subscriber agreements.

BACKGROUND OF THE INVENTION

Proliferation of smart phones, and their subsequent use to perform high data-rate communications, has resulted in an exponential growth in the volume of data flowing over wireless networks. The increased volume of data flowing over the networks is taxing the service providers and the network infrastructure responsible for ensuring the data flows at acceptable rates for most, if not all, users. If unchecked, a small population of users of the wireless networks, consumers of excessive portions of the available wireless network bandwidth would degrade quality of service for all users. Such abuse of wireless networks, or at least the threat of such abuse, has led service providers to restrict the amount of data bits communicated by individual users' wireless devices over a specified of period of time (e.g., a month) for a given subscriber agreement.

A consequence of the phenomenon of greatly expanded data flow, and the resulting imposition of necessary use limits on subscribers that exceed reasonable use limitations based upon their subscription agreement, is the emergence of large numbers of subscribers that violate, perhaps innocently, the terms of service of their subscriptions. Identifying violators and limiting their data usage is implemented in known systems by a policy server closely integrated with data transmission within a mobile network and potentially introducing unacceptable bottle necks, increased data transmission overhead and delays.

SUMMARY OF THE INVENTION

A method is described for managing data resource utilization in a wireless network environment comprising a first data network and a second data network. The method comprises monitoring data usage over the first data network, determining that the data usage over the first data network satisfies a specified criterion. The method further comprises, in response to the determination step, administratively disconnecting a wireless network subscriber from the first data network so as to cause a data session of the wireless network subscriber to be reassigned to the second data network.

A system is described for managing data resource utilization in a wireless network environment. The system comprises a first data network, a second data network communicatively coupled to the first data network in the wireless network environment, and a rating engine configured to monitor data usage over the first data network and, upon determining that the data usage over the first data network satisfies a specified criterion, cause a wireless network subscriber to be administratively disconnected from the first data network so as to further cause a data session of the wireless network subscriber to be reassigned to the second data network.

A non-transitory computer readable medium is described having stored there on computer executable instructions for managing data resource utilization in a wireless network environment comprising a first data network and a second data network. The instructions comprising monitoring data usage over the first data network, determining that the data usage over the first data network satisfies a specified criterion. The instructions further comprising, in response to the determination step, administratively disconnecting a wireless network subscriber from the first data network so as to cause a data session of the wireless network subscriber to be reassigned to the second data network.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

The following illustrative examples further describe the invention. They should not however, be construed as limiting its scope to any particular described structures or steps.

A system and method are illustratively depicted and described herein that reassign a high-speed data mobile device from a relatively higher speed network (e.g., 1xEVDO) to a lower-speed data network (e.g., 1xRTT). Such reassignment occurs, for example, by way of a network data user/user management infrastructure including: (a) a back office rating engine, (b) an Operating Support System (OSS) configured to provision network elements, and (c) an authentication mechanism for controlling access to the high-speed data network. The back office rating engine accumulates data usage during, for example, a subscriber's monthly billing cycle. Based on specified criteria (e.g., data usage rules and/or limits) maintained on the system in accordance with, for example, a subscriber agreement, a threshold for total data usage is set. After it has been determined that the subscriber has reached the threshold, the user is reassigned from a current, higher speed, network (e.g., 1xEVDO) to a slower network (e.g., 1xRTT network).

By way of example, after the system determines the subscriber has reached the threshold, reassignment of the subscriber to the slower data network commences wherein the rating engine triggers the OSS to: administratively disconnect the user from the currently assigned (i.e., the preferred/higher speed) network by, for example, triggering issuance of a resource reclaim message from an accounting authentication authorization (AAA) server, reclaim network resources previously allocated to the subscriber's session including clearing cached information on the session from various network elements such as a radio network controller (RNC) and packet data serving node (PDSN), and update the AAA user profile to deny A12 device authentication on the preferred/higher speed network. Thus, at this point the user will be unable to access the preferred/higher speed data network using an ID linked to the account/subscription for which the data threshold has been met. In a particular example (noted above), the user exceeds a data limit on a preferred network, such as a third generation (3G) 1xEVDO data network, and is reassigned by the aforementioned system components to a slower data network, such as 1xRTT. Thereafter, for each subsequently initiated data session (including one initiated by the user in response to being disconnected from the higher speed network) while the system registers that the data usage threshold has been met (e.g., the remainder of a current subscription month), the user will be assigned to the slower network. The subscriber management and network reassignment scheme does not require integrating a policy server into the preferred network, and does not require continued use of high-speed network resources once a wireless communications subscriber has been reassigned to a lower speed data network.

There are many ways to implement the reassignment and subsequent re-establishment of permission to use the higher speed data network. For example, at the end of the monthly billing cycle, the AAA profile is reset to allow device authentication to continue, thereby again granting 3G data network access. Alternatively, in a pay-as-you-go scheme, the subscriber's rights to use of the higher speed network are re-established upon payment of a specified fee, regardless of whether the subscriber's current month has expired. In a hybrid implementation scheme, a user purchases additional data bits on the higher speed network and access to the higher speed network continues until the purchased data bits have been consumed by the user's subsequent use of the higher speed network. The above-described alternatives demonstrate the existence of multiple ways for managing a user's/subscriber's status for purposes of determining whether the user is reassigned from the higher speed data network to the lower speed data network.

Figure 1:
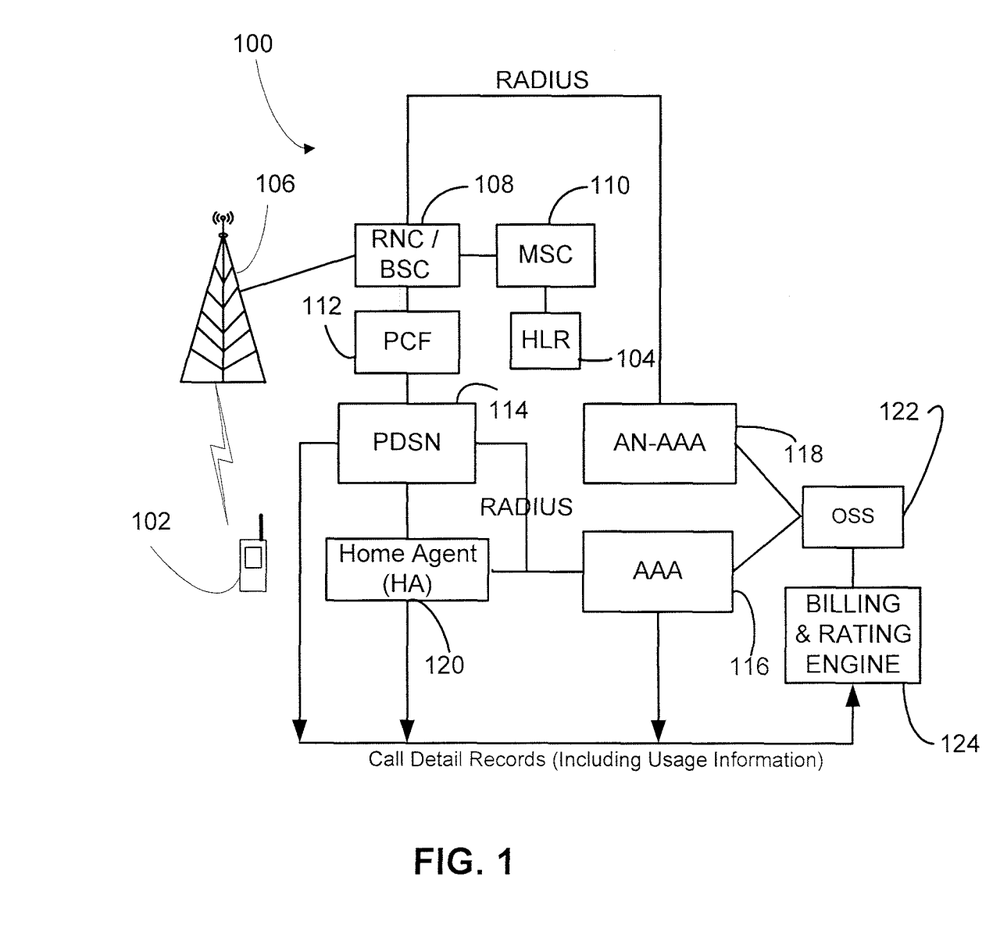
FIG. 1 is a schematic diagram illustrating a mobile environment in accordance with an embodiment of the invention.

Turning to FIG. 1, an illustrative schematic diagram depicts an exemplary implementation of a system for implementing the above-described user reassignment when a data use threshold is reached. The illustrative example is presented in a mobile wireless system 100 environment. In the illustrative embodiment, the wireless system 100 includes wireless network support structures that operate in accordance with a CDMA2000 specification. In the exemplary embodiment, the mobile system environment incorporates and provides data services supporting multiple data access protocols, such as 1xEVDO and 1xRTT, thereby having multiple data network overlays. In alternative embodiments other multiple data access protocol combinations are supported within the mobile system environment 100. Potentially applicable wireless systems concurrently provide multiple data networks, including, without limitation, systems operating in accordance with multiple wireless communications standards, each having its own data access protocol. Examples include embodiments of the wireless system 100 that concurrently support multiple data networks performing wireless transmissions complying with combinations of multiple wireless communication protocols including generations and/or types of telecommunication standards, such as LTE, WCDMA, UMTS, GSM, GPRS, EDGE, Wi-Fi (i.e., IEEE 802.11x), WiMAX (i.e., IEEE 802.16), or the like, for delivering voice and data services to a mobile device 102. The mobile device 102 can take on any of a variety of forms including, for example: a mobile phone, a PDA, or a mobile computer (e.g., a laptop, notebook, notepad, tablet, etc.) having wireless data communication capability.

The home location register (HLR) 104 provides services for authenticating an identity of the mobile device 102 prior to permitting access to radio access network resources of the wireless system 100. The HLR 104, by way of example, maintains a database of subscribers to the wireless system 100. Each individual subscriber (e.g., each distinctly identified mobile device) entry includes a Mobile Identification Number (MIN) and/or Electronic Serial Number (ESN).

The wireless system 100 includes a plurality of base stations, such as base station 106. The base station 106, by way of example, includes radio bearer resources and other transmission equipment necessary for wireless communication of information between the mobile device 102 and other network elements. The number of network overlays delivered by a base station (e.g., base station 106) differs in accordance with various exemplary network configurations. In the example provided in FIG. 1, the base station 106 includes radio bearer resources corresponding to multiple data network overlays. Alternatively, each data network overlay is delivered via a distinct base station.

Moreover, for each data access network, radio access network resources are used to control the radio interface aspect of the system 100 that includes the plurality of base stations. Control of the radio interface of the system 100 is carried out, for example, by a radio network controller (RNC) or a base station controller (BSC), identified in FIG. 1 as RNC/BSC 108. The RNC/BSC 108 manages the radio traffic between a plurality of base stations such as base station 106. Such management of radio traffic includes controlling handoff between sectors and/or base stations.

Additionally, the wireless system 100 illustratively depicted in FIG. 1 includes a mobile switching center (MSC) 110. The MSC 110 manages voice calls placed in and out of the wireless system 100.

Continuing with the illustrative schematic depiction of the wireless network 100, a packet control function (PCF) 112 is communicatively coupled to the RNC/BSC 108. The PCF 112 carries out the function of routing data packets from the RNC/BSC 108 to one of a set of PDSNs. The RNC/BSC 108 is, by way of example, collocated with a packet control function (PCF) 112. It is noted that in the illustrative example, the system 100 is depicted as having a single packet data serving node (PDSN)—i.e., PDSN 114, and in such instance the PCF 112 is not needed to perform the aforementioned routing to a particular one of multiple PDSNs. However, in cases where a wireless system comprises multiple PDSNs, the PCF 112 selectively routes data packets received from the RNC/BSC 108 to an appropriate one of the set of PDSNs for further processing.

The illustrative wireless system 100 includes one or more services (implemented in the form of computer executable instructions carried out by processors on one or more physical server machines) that authenticate and determine/designate access rights for particular identified entities prior to granting access to the wireless system 100's data network transmission services. In the exemplary embodiment, such authentication services are provided by an accounting authentication authorization (AAA) service 116 and an access node accounting authentication authorization (AN-AAA) service 118.

The AAA service 116 carries out the task, during set up of a session for an identified subscriber, of ensuring that the subscriber associated with the mobile device 102 is allowed to use the data resources of the system 100. After initially confirming the authenticity of the identified user seeking to establish a user session, the AAA service 116 provides a response including a profile for the identified user including, among other things, user permissions. The permissions can be implicit—e.g., the user is identified as belonging to a particular group—or explicitly listed in the profile assigned to the system.

In the exemplary system, where multiple, data network overlays are supported, the AN-AAA service 118 carries out an initial authorization function (e.g., A12 device authentication) to determine whether the mobile device 102 is permitted to use a preferred one (e.g., 1xEVDO) of the multiple supported data network overlays. By way of example, the RNC/BSC 108 invokes the AN-AAA service 118 prior to setup of a mobile IP session for the mobile device (via AAA service 116). In response, the AN-AAA service 118 determines whether or not to authorize the mobile device 102 for 1xEVDO access. The RNC/BSC 108 communicates with the AN-AAA service 118 using, for example, the RADIUS protocol. It is noted that the AN-AAA service 118, in accordance with the illustrative example, provides an authorization for the mobile device 102 (upon successful authentication/authorization) to establish a session on the 1xEVDO data network. The actual creation of such session subsequently occurs via the PDSN 114 and AAA service 116.

Upon completion of the user authorization process for the use of data resources, via the PDSN 114 and AAA service 116, a home agent (HA) 120 forwards an IP address, received from the AAA server 116, to the PDSN 114. The PDSN 114, in turn, forwards the IP address to the mobile device 102. In the illustrative example, the HA 120 is a router located on a home network of the mobile device 102. The HA 120 tunnels packets from the home network to the mobile device 102 when the mobile device 102 is roaming.

An Operating Support System (OSS) 122 serves as a central point for administration, management, and provisioning of all network elements. Among other things, the OSS 122 administers the individual accounts of subscribers that use the wireless system 100.

In accordance with an exemplary embodiment, the wireless system 100 further includes a billing and rating engine 124. As indicated in FIG. 1, the billing and rating engine 124 is a back office system that is configured to communicate certain information, based upon subscriber usage information received from other components of the system 100, to the OSS 122. By way of example, the billing and rating engine 124 monitors data transmissions (e.g., quantity of data bits transmitted) by wireless network subscribers over the 1xEVDO network overlay (i.e., the preferred data transmission network). Upon determining that the data usage by a particular subscriber over the high-throughput data network satisfies a specified criterion (e.g., a specified maximum data usage threshold, such as 5 GB per billing cycle), the billing and rating engine 124 issues a notification to the OSS 122 that the subscriber is not permitted access to the 1xEVDO network. The notification to the OSS 122 initiates administrative disconnection of the wireless network subscriber (e.g., mobile device 102) from the 1xEVDO data network.

"Administratively disconnecting," as used herein, is intended to be broadly defined to include a variety of actions taken by network administrative components to alter a status of an affected subscriber account to prevent users associated with the subscriber account from using the data network overlay from which the subscriber account has been administratively disconnected. Thus, act of administratively disconnecting a subscriber account, in exemplary embodiments, results in immediate termination of a current user session. Alternatively, administratively disconnecting a subscriber account does not result in immediate termination of a current user session. Rather, the current session is allowed to persist until a specified future terminating event occurs (e.g., the user terminates the current session, a delay timer expires, a warning has issued and the user failed to respond in a satisfactory manner). Regardless of whether administratively disconnecting an account results in immediate termination of a current session, in all cases administratively disconnecting an account from a higher tier data network overlay results in modification of permissions assigned the subscriber account such that a subsequent request to establish a session on the higher tier data network, from which the account is administratively disconnected, will be denied by logon/authentication services. For example, as described in further detail in an illustrative example below, the "administrative disconnection" of a wireless subscriber from the 1xEVDO data network does indeed result in termination of a current session on the 1xEVDO data network overlay and ensures that a next time the subscriber (e.g., mobile device 102) attempts to establish a session on the wireless network, the AN-AAA will reject the subscriber's request to establish a session on the preferred (e.g., 1xEVDO) data network overlay.

It is emphasized that when a particular subscriber is "administratively disconnected," such action by network administration components does not necessarily terminate a current session. For example, in one example, the subscriber is permitted access to the preferred network overlay for the remainder of the current session (with a possible "grace period" limit placed on even that session before the violating session is terminated by the system 100). However, regardless of the timing for terminating a current session, the OSS 122 notifies the AN-AAA 118 that a particular "administratively disconnected" subscriber is no longer permitted access to the preferred (e.g., 1xEVDO) data network overlay, and the AN-AAA 118 denies authorization to the identified subscriber in response to an (A12) authentication request received from the administratively disconnected subscriber via the RNC/BSC 108. The above-described administrative disconnection of the subscriber from the preferred network has the effect of reassigning the wireless network service subscriber to a relatively lower-speed (e.g., 1xRTT) data network overlay in the wireless system 100.

As those of ordinary skill in the art will realize, the foregoing network elements of the wireless system 100 are implemented via special-purpose telecommunications equipment having one or more computer processors, as well as non-transitory computer readable media, such as RAM/ROM, solid-state memory, and/or hard drive memory and the like, which store computer executable instructions for executing embodiments of the method described in further detail below with reference to FIG. 3.

Figure 2:
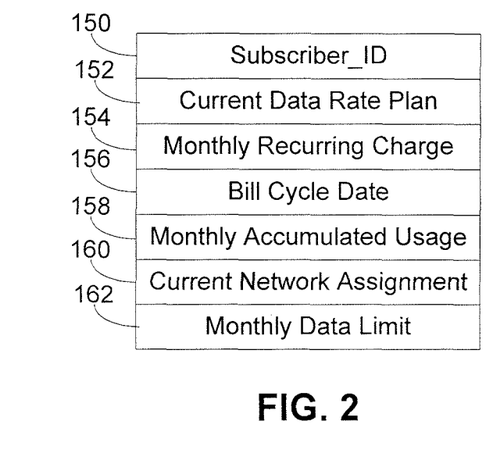
FIG. 2 identifies a set of data fields in a physical storage medium that support management of user data usage and reassignment of users when limits are reached in accordance with a subscriber/usage agreement with a data communications service provider.

Turning to FIG. 2, an exemplary set of fields for a data structure are provided that support management, by the billing and rating engine 124 and/or the OSS 122, of subscriber status with regard to permission to use the preferred wireless data network overlay (e.g., 1xEVDO) and reassignment to the lower speed wireless data network overlay (e.g., 1xRTT) by the action of administrative disconnection of a subscriber when a data usage threshold is reached for the user. A subscriber_ID field 150 is a unique value assigned to a particular subscriber (e.g., the identification assigned to the mobile device 102). In the context of the network reassignment scheme described herein, the subscriber_ID 150 is the identification assigned to a particular subscriber account (that may comprise multiple linked mobile devices—such as multiple devices linked to a single account under a "family plan" wireless service subscription).

A current data rate plan field 152 identifies one of multiple plans supported by the wireless system 100. An element of the plan of specific interest, to the billing and rating engine 124, for purposes of initiating reassignment and administrative disconnection of a mobile device is a monthly allocated monthly data usage limit (e.g., 2 gigabytes of data per month) for the subscriber. The data limit, extracted from terms of the identified plan, is stored in a monthly data limit field 162. For example, if the allocated data usage limit is set to 2 GB of data per month, then the subscriber is administratively disconnected, and reassigned from the 1xEVDO data network to the 1xRTT data network, once data usage specified in field 158 exceeds the 2 GB limit specified in field 162 (triggering administrative disconnection and reassignment of the subscriber account).

A monthly recurring charge field 154 stores an amount charged to the wireless customer on a monthly basis for data usage under the plan specified in the current data rate plan field 152. A bill cycle date field 156 specifies the date of the month in which a subscriber's accumulated data usage, stored in a monthly accumulated usage field 158, is reset. In the illustrative example, a current usage value counts upward toward a specified limit. However, an alternative, that avoids repeated accessing the monthly data limit field 162, is to reset a counter to the monthly data limit every month and subtract from that stored value (i.e., "data usage remaining") until the value reaches zero to signal initiation of "administrative disconnection" and reassignment of the subscriber to the less preferred wireless data network overlay.

Lastly, a current network assignment field 160 stores a value indicating the status of the subscriber with regard to which one, of multiple supported wireless data network overlays, the subscriber is currently assigned. In a case where only two overlays are available (e.g., 1xEVDO and 1xRTT), then a single bit in a record can be used to indicate the current network assignment of the subscriber. In alternative embodiments, where several networks are available or the available networks changes, alphanumeric strings are used to identify the assignment for a subscriber within the current network assignment field 160.

Figure 3:
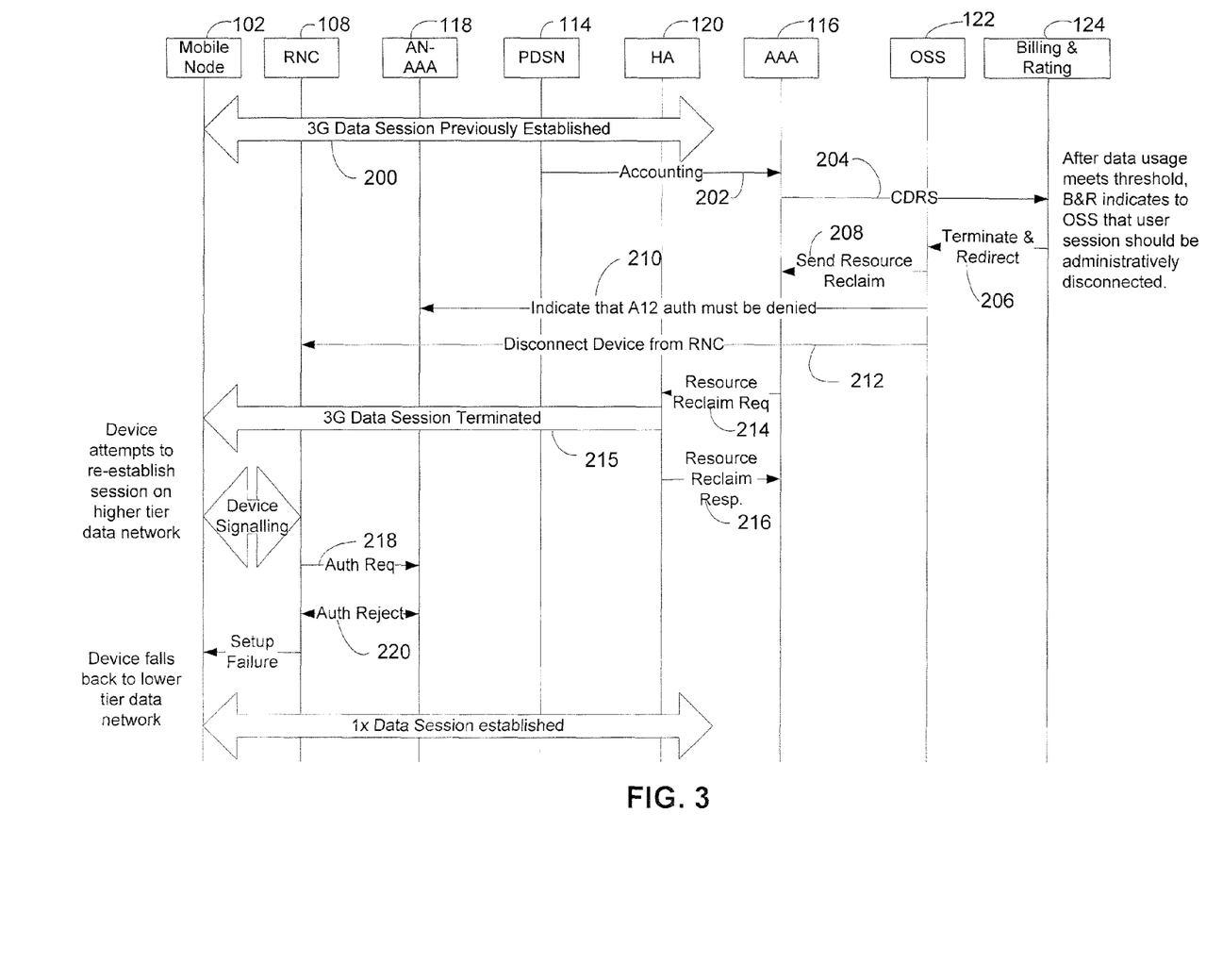
FIG. 3 is a schematic diagram illustrating a message flow in accordance with an embodiment of the invention.

Turning to FIG. 3, a message flow in accordance with an embodiment of the invention is shown. In particular, the example is showing a series of events and actions that occur when a subscriber's current monthly accumulated data usage (see, FIG. 2, field 158) has not yet reached a monthly data limit (see, FIG. 2, field 162). Both of these values are of course maintained by the billing and rating engine 124. In the illustrative example, the monthly accumulated data usage (specified in field 158) for the subscriber account associated with the mobile device 102 initially has not reached its monthly limit (specified in field 162). During a session the mobile device 102 carries out data transfers over the wireless network causing the account to reach the monthly limit (specified in field 162). The subscriber is administratively disconnected from the preferred wireless data network overlay (1xEVDO) and reassigned to the less preferred data network overlay (1xRTT).

Turning to the specific steps depicted in the illustrative example of FIG. 3, during step 200, the mobile device 102 establishes a data session over the high-speed data network, such as a third generation (3G) data network, via the RNC 108, AN-AAA 118, and PDSN 114. In an embodiment, the high-speed data network is an 1xEVDO data network overlay of the wireless system 100.

In accordance with step 202, during the data session, the PDSN 114 communicates the accounting information to the AAA server 116. In the illustrative embodiment, during step 204 the AAA 116, in turn, communicates the accounting information, such as Call Detail Records (CDR), to the billing and rating engine server 124. As previously noted, with reference to FIG. 2, the billing and rating engine 124 maintains a record describing each subscriber account, data limits (e.g., 5 gigabytes per month), and current usage.

Thus, in accordance with step 204, the billing and rating engine 124 monitors and accumulates mobile device data usage during the mobile device 102's high-speed data session on the preferred wireless network data overlay (e.g., 1xEVDO). Upon reaching a data usage threshold specified under a current data usage plan that specifies criteria with respect to the monitored data usage of the preferred wireless data network overlay, the billing and rating engine 124 issues a notification to the OSS 122 that the subscriber has reached the specified threshold where administrative disconnection and reassignment of the subscriber (to the less preferred data network overlay) occurs. In a particular example, the billing and rating engine 124 issues a notification to the OSS 122 that the mobile device 102's current session on the preferred data network overlay should be terminated. In the illustrative embodiment, the implemented by the billing and rating engine 124 comprises a specified data usage limit, such as a maximum allowed data usage over a specified time period (e.g., a billing cycle or daily maximum usage, or the like), as configured at the OSS 122. In one embodiment, the specified data usage limit for the high-speed data network is applicable to the roaming subscribers in order to prioritize the high-speed data network resources for the home subscriber population. Alternatively, the above reassignment and administrative disconnection functionality is coupled with a tiered pricing scheme. Thus, in this alternative embodiment, after a subscriber account reaches a threshold specified by the monthly data limit, rather than precluding the user from using the preferred data network overlay, the subscriber is permitted to consent to being charged a premium to continue access on the preferred wireless data network overlay. If the subscriber does not consent to payment of the premium, the subscriber is reassigned to the less preferred (e.g., 1xRTT) data network overlay for the remainder of the billing cycle. It is noted that the above decision-making occurs in the OSS 122, rather than the billing and rating engine 124, in other implementations of the administrative disconnection and reassignment scheme generally described herein wherein subscribers are precluded from using a preferred data network overlay when their usage meets a specified threshold.

Thus, in accordance with the above-described exemplary usage monitoring and plan data limit enforcement functionality, during step 206 the billing and rating engine 124 sends a Terminate and Redirect message to the OSS 122. The Terminate and Redirect message can take on any of a variety of forms depending on the preferences of the OSS 122's particular vender preferences. In a simple case, a web services API exposed by the OSS (and invoked by a call from the billing and rating engine 124) would implement the Terminate and Redirect message causing the mobile device 102 session to be terminated. In other instances less drastic measures are taken such as the user is notified that the subscription has been reassigned to the less preferred data network overlay (i.e., the current session will not terminate and reassignment will take effect the next time the subscriber attempts to connect to the wireless network).

In accordance with an illustrative example, receipt of the Terminate and Redirect message causes the OSS 122 to initiate a plurality of messages for disconnecting the mobile device 102 from the high-speed data network, clearing all cached session information from various network elements (e.g., from the RNC, AN-AAA, and PDSN), and updating the user profile at the AAA server 116 to deny A12 device authentication on the high-speed data network.

Specifically, as illustratively depicted in steps 208-210, the OSS 122 sends a Resource Reclaim message to the AAA 116 and updates the user profile at the AN-AAA server 118 to indicate that any subsequent A12 authentication request from the mobile device 102 to the AN-AAA server 118 for permission to establish a session on the high-speed data network should be denied. In the illustrative example, the OSS 122 instructs the AN-AAA server 118 to deny authentication. Such instruction will remain in place at the AN-AAA server 118 until the OSS 122 rescinds the directive to deny access by the mobile device 102's subscriber to the preferred wireless data network overlay. The subsequent instruction to rescind the denial directive is issued, possibly on a scheduled basis, upon commencement of a next billing cycle or any other specified time period.

With continued reference to the illustrative example in FIG. 3, during step 212 the OSS 122 sends a message to the RNC 108 to disconnect the current session of the mobile device 102 on the preferred data network overlay. The RNC 108 then clears a session cache timer for the high-speed data session so that the mobile device 102 is no longer authenticated. Moreover, in response to receiving (during step 108) the Resource Reclaim message from the OSS 122, during step 214 the AAA server 116 issues a Resource Reclaim Request message to the HA 120. At step 215, the HA 120 thereafter terminates the high-speed data session for the mobile device 102. Thereafter, at step 216 the HA 120 issues a Resource Reclaim Response message to the AAA server 116.

Consequently, at a later time when the mobile device 102 issues a request to establish a session on the preferred wireless data network overlay (e.g., the 1xEVDO overlay), the A12 authentication request is denied by the AN-AAA 118. This request/denial sequence is depicted in steps 218 and 220 of FIG. 3. In the illustrative example, upon denial of the request to establish a session on the preferred wireless data network overlay, the mobile device 102 automatically (or manually by the user) issues a request to initiate a session on the less preferred (e.g., 1xRTT) wireless data network overlay, based on mobile device settings.

In another embodiment, the mobile device 102 is directed by the wireless system 100 (e.g., by OSS 122) to initiate the data session on the low-speed 1xRTT network. Such functionality is implemented, for example, using an application that controls the communication stack of the mobile device 102. The application communicates directly with the OSS (client-server model) via a well know protocol such as "http over port 80." Once the mobile device 102 is informed that access to the 1xEVDO data network overlay will not be granted, the application will commence initiation of a 1xRTT wireless data session.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each distinct value falling within the range, unless otherwise indicated herein, and each distinct value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing, by a mobile wireless data network service provider, data resource utilization, by a plurality of mobile wireless network service subscribers, in a wireless network environment comprising a first data network and a second data network, the method comprising:
   monitoring, by the mobile wireless data network service provider, data usage over the first data network;
   determining that the data usage over the first data network satisfies a specified criterion; and
   in response to the determining step, administratively disconnecting, by the mobile wireless data network service provider, a wireless network subscriber, of the plurality of mobile wireless network service subscribers, from the first data network so as to cause a subsequent data session of the wireless network subscriber to be reassigned to the second data network.

2. The method of claim 1 wherein the data usage over the first data network measured during the monitoring step is data usage by the wireless network subscriber.

3. The method of claim 2 wherein the specified criterion comprises reaching a specified maximum usage threshold by the wireless network subscriber.

4. The method of claim 3 wherein the maximum usage threshold is associated with a specified duration.

5. The method of claim 4 wherein the wireless network subscriber is prevented from establishing a session on the first data network for a remainder of the specified duration.

6. The method of claim 2 wherein the first data network is configured to support a higher data throughput per user session than a throughput supported on a per user session on the second data network.

7. The method of claim 2 wherein administratively disconnecting the wireless network subscriber from the first data network comprises triggering a resource reclaim message.

8. The method of claim 2 wherein, as a consequence of administratively disconnecting the wireless network subscriber, further steps are performed for:
clearing cached information on the data session from a plurality of network elements, and
updating, by the mobile wireless data network service provider, a user profile associated with the wireless network subscriber to deny user device authentication on the first data network.

9. The method of claim 8 wherein the plurality of network elements comprises at least one of a Radio Network Controller (RNC) and a Packet Data Serving Node (PDSN).

10. The method of claim 8 wherein after the user device is denied authentication on the first data network, further steps are performed to automatically route a request to initiate a data session to the second data network.

11. The method of claim 6 further comprising:
denying, in accordance with the administratively disconnecting, the user device authentication on the first data network, and
directing, after the denying step, a request to initiate a data session by the user device to the second data network.

12. A mobile wireless data network service provider system for managing data resource utilization by a plurality of mobile wireless network service subscribers, in a wireless network environment, the system comprising:
a first data network;
a second data network communicatively coupled to the first data network in the wireless network environment; and
a rating engine, maintained by the mobile wireless data network service provider, configured to monitor data usage over the first data network and, upon determining that the data usage over the first data network satisfies a specified criterion, cause a wireless network subscriber, of the plurality of mobile wireless network service subscribers, to be administratively disconnected from the first data network so as to further cause a subsequent data session of the wireless network subscriber to be reassigned, by the mobile wireless data network service provider, to the second data network.

13. The system of claim 12 wherein the data usage over the first data network monitored by the rating engine is data usage by the wireless network subscriber.

14. The system of claim 13 wherein the specified criterion comprises reaching a predetermined maximum usage threshold by the wireless network subscriber.

15. The system of claim 14 wherein the maximum usage threshold is associated with a specified duration.

16. The system of claim 15 wherein the wireless network subscriber is prevented from establishing a session on the first data network for a remainder of the specified duration.

17. The system of claim 13 wherein the first data network is configured to support a higher data throughput per user session than a throughput supported on a per user session on the second data network.

18. The system of claim 13 wherein the rating engine causes the wireless network subscriber to be administratively disconnected from the first data network by causing an Operation and Support System (OSS) to trigger a resource reclaim message.

19. The system of claim 13 wherein, as a consequence of the administrative disconnection of the wireless network subscriber, the rating engine causes an Operation and Support System (OSS) to clear cached information on the data session from a plurality of network elements and to update a user profile, maintained by the mobile wireless data network service provider, associated with the wireless network subscriber to deny user device authentication on the first data network.

20. The system of claim 19 wherein the plurality of network elements comprises at least one of a Radio Network Controller (RNC) and a Packet Data Serving Node (PDSN).

21. The system of claim 19 wherein administrative components of the network are configured such that after the user device is denied authentication on the first data network, and the system automatically routes a request to initiate a data session to the second data network.

22. The system of claim 19 wherein the system is configured such that after the user device is denied authentication on the first data network, the user device is directed to initiate the data session to the second data network.

23. A non-transitory computer readable medium having stored thereon computer executable instructions for managing, by a mobile wireless data network service provider, data resource utilization, by a plurality of mobile wireless network service subscribers, in a wireless network environment comprising a first data network and a second data network, the instructions being executed by a mobile wireless data service provider to perform a set of steps comprising:
monitoring, by the mobile wireless data network service provider, data usage over the first data network;
determining that the data usage over the first data network satisfies specified criterion; and
in response to the determining step, administratively disconnecting, by the mobile wireless data network service provider, a wireless network subscriber, of the plurality of mobile wireless network service subscribers, from the first data network so as to cause a subsequent data session of the wireless network subscriber to be reassigned to the second data network.

24. The non-transitory computer readable medium of claim 23 wherein the data usage over the first data network measured during the monitoring step is data usage by the wireless network subscriber.

25. The non-transitory computer readable medium of claim 24 wherein the specified criterion comprises reaching a specified maximum usage threshold by the wireless network subscriber.

26. The non-transitory computer readable medium of claim 25 wherein the maximum usage threshold is associated with a specified duration.

27. The non-transitory computer readable medium of claim 26 wherein the wireless network subscriber is prevented from establishing a session on the first data network for a remainder of the specified duration.

28. The non-transitory computer readable medium of claim 24 wherein the first data network is configured to support a higher data throughput per user session than a throughput supported on a per user session on the second data network.

29. The non-transitory computer readable medium of claim 24 wherein administratively disconnecting the wireless network subscriber from the first data network comprises triggering a resource reclaim message.

30. The non-transitory computer readable medium of claim 24 comprising further computer-executable instructions such that wherein, as a consequence of administratively disconnecting the wireless network subscriber, further steps are performed for:
   clearing cached information on the data session from a plurality of network elements, and
   updating, by the mobile wireless data network service provider, a user profile associated with the wireless network subscriber to deny user device authentication on the first data network.

31. The computer readable medium of claim 30 wherein the plurality of network elements comprises at least one of a Radio Network Controller (RNC) and a Packet Data Serving Node (PDSN).

32. The computer readable medium of claim 30 comprising further computer-executable instructions such that wherein after the user device is denied authentication on the first data network, further steps are performed to automatically route a request to initiate a data session to the second data network.

33. The computer readable medium of claim 30 further comprising computer-executable instructions for:
   denying, in accordance with the administratively disconnecting, the user device authentication on the first data network, and
   directing, after the denying step, a request to initiate a data session by the user device to the second data network.

* * * * *